Nov. 7, 1939.   H. H. GORRIE   2,179,450
CONTROL SYSTEM
Filed Feb. 25, 1936   2 Sheets-Sheet 1

INVENTOR
HARVARD H. GORRIE
BY
Raymond H. Junkins
ATTORNEY

Nov. 7, 1939.  H. H. GORRIE  2,179,450
CONTROL SYSTEM
Filed Feb. 25, 1936  2 Sheets-Sheet 2

INVENTOR
HARVARD H. GORRIE
BY
Raymond W. Junkins
ATTORNEY

Patented Nov. 7, 1939

2,179,450

UNITED STATES PATENT OFFICE 2,179,450

CONTROL SYSTEM

Harvard H. Gorrie, Cleveland Heights, Ohio, assignor to Bailey Meter Company, a corporation of Delaware Application February 25, 1936, Serial No. 65,675

1 Claim. (Cl. 137—153)

This invention relates to control systems wherein a valve or other device for regulating an agent affecting a controlled condition is positioned by a fluid pressure servo-motor. In such systems a loading pressure is usually established in accordance with the departure of the controlled condition from a desired standard; and utilized either directly or through suitable relays to operate the servo-motor.

In order that the controlled condition may be maintained without undue departure from the standard it is desirable that changes in loading pressure be proportional to changes in the controlled condition; and in some cases that the loading pressure be further continuously modified at a rate proportional to the amount of deviation of the controlled condition from the standard. It is apparent that small changes in the controlled condition will produce minute changes in the loading pressure; and that slight deviations in the controlled condition from the standard will produce a very slow rate of change in the loading pressure. It is further apparent that the valve or other regulating device must be positioned by the servo-motor instantaneously and in exact accordance with changes in loading pressure if the control system is to perform its primary function, which is to maintain the controlled condition at the standard.

Valves and other agent regulating devices as commonly used in industry are usually of large size and require a powerful servo-motor for proper operation. Obviously in all cases a certain amount of friction will be present in such servo-motors and the associated valve or regulator. Where the servo-motor is used to operate a valve or damper additional friction will be introduced due to the necessary pressure packing; and the power required to operate the valve in one direction as against that required to operate it in opposite direction may be quite different, due to the action of the pressure against the movable valve or damper member. Small changes in loading pressure may be insufficient to overcome this friction, and accordingly the agent regulating device may not be positioned precisely proportional to changes in the controlled condition, nor continuously in accordance with the amount of deviation in the controlled condition from the standard, as is sometimes desired.

My invention particularly relates to apparatus for insuring that the agent regulator is accurately and instantaneously positioned by changes in the loading pressure regardless of how minute such changes may be. In accordance with my invention I utilize the loading pressure to operate suitable valve means to admit fluid under a relatively high pressure to the servo-motor, or discharge fluid therefrom, until the position of the servo-motor is in predetermined relation to the magnitude of the loading pressure.

Further features of my invention will become apparent from the following description and from the drawings in which.

Figure 1:
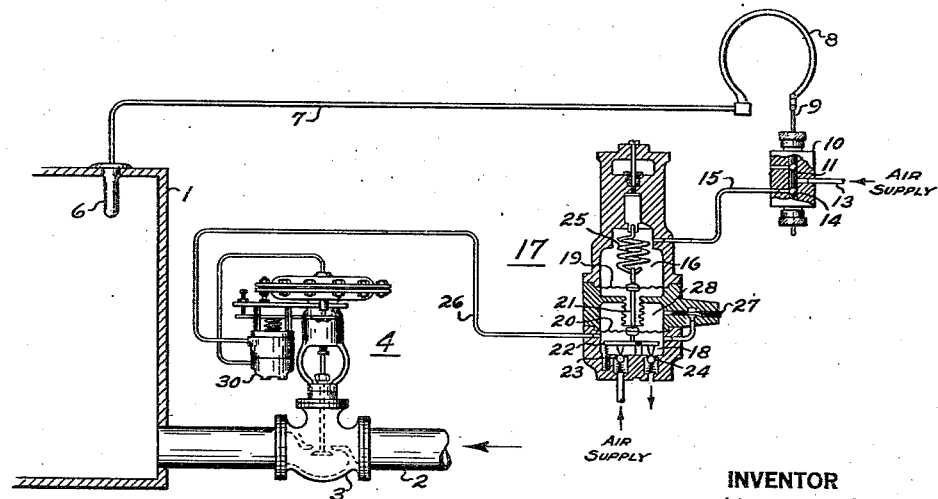
Fig. 1 is a diagrammatic illustration of a typical control installation embodying my invention.

In Fig. 1 I have shown my control system arranged to maintain a controlled condition such as the temperature within a tank 1 at a desired standard. Heating fluid such as steam is supplied through a conduit 2; the rate of flow being regulated by a valve 3 operated by a fluid pressure sensitive diaphragm servo-motor generally indicated at 4. As shown, increases in fluid pressure within the motor 4 are effective for positioning the valve 3 in an opening direction. The force produced by the fluid pressure on the diaphragm is opposed by a spring 5, shown in Fig. 2.

In order that the valve 3 will be properly positioned to maintain the temperature within the tank 1 at the desired standard, I preferably establish or produce a loading pressure proportional to the temperature within the tank 1 and utilize such loading pressure to control the fluid pressure effective within the diaphragm motor 4. To this end I show a temperature sensitive bulb 6 located within the tank 1 and connected by a capillary 7 to a suitable Bourdon tube 8. As known, the temperature measuring device comprising the bulb 6, capillary 7 and Bourdon tube 8 may be filled with a gas or vapor, the pressure of which changes with changes in temperature around the bulb 6; and acts to position the free end of the Bourdon tube 8 in accordance with temperature changes.

Pivotally connected to the Bourdon tube 8 is a movable valve member 9 of a pilot valve 10 which may be of the type forming the subject matter of Patent No. 2,054,464, granted September 15, 1936, to Clarence Johnson. The movable valve member 9 extends longitudinally through a passageway 11 and is provided with lands of slightly less diameter than the passageway 11. Fluid pressure admitted to the passageway 11 through an inlet 13 bleeds past the lands to the atmosphere. Adjacent each land is a narrow annular outlet port 14. It is apparent that the pressure existing at the outlet port will depend upon the position of the movable valve member 9. As I prefer to establish a loading pressure varying inversely with variations in temperature within the tank 1, I transmit the pressure existing at the lower outlet 14 through a pipe 15 to a chamber 16 of a relay 17.

The relay 17 may be of the type forming the subject matter of my Patent No. 2,098,914, granted Nov. 9, 1937. Pressures established in the chamber 16 are balanced against pressures established in a relay chamber 18 through the agency of opposed diaphragms 19 and 20 operatively connected by a movable member 21. Admission and discharge of pressure fluid from the chamber 18 is controlled by a fulcrumed valve member 22 operating a fluid supply valve 23 and an exhaust valve 24. The arrangement is such that upon an increase in pressure within the chamber 16 in response to a decrease in temperature within the tank 1 the member 21 moves downwardly, opening the inlet valve 23 until the pressure within the chamber 18 is increased proportionately to the increase in pressure within the chamber 16, when the member 21 will be positioned to the neutral position and valves 23 and 24 closed. The initial relation between the pressure existing within the chamber 16 and that existing within the chamber 18 at which the member 21 will be in the neutral position may be varied as desired through the agency of a suitable adjustable loading spring 25, effective for producing a force upon the diaphragm 19. Fluid pressures established within the chamber 18 are transmitted through a pipe 26 to the servo-motor 4, where they are effective for producing proportionate positioning of the valve 3 as hereinafter more fully described.

If it is desired that upon a deviation of the temperature within the tank 1 from the desired standard the rate of flow of steam thereto be continuously varied until the temperature is restored to the standard, this may be accomplished by connecting the chamber 18 through an adjustable bleed valve 27 to a chamber 28. Pressures within the chamber 28 act in opposition to those within the chamber 18, against the diaphragm 20. With this arrangement, upon the temperature within the tank 1 deviating from that desired, producing a proportionate pressure change in the chamber 18, pressure fluid will gradually seep through the bleed valve 27 into the chamber 28, causing a further change in pressure within the chamber 18. Such regenerative action will continue until the valve 3 reaches an extreme of travel or the temperature within the tank 1 is restored to the desired value.

Figure 2:
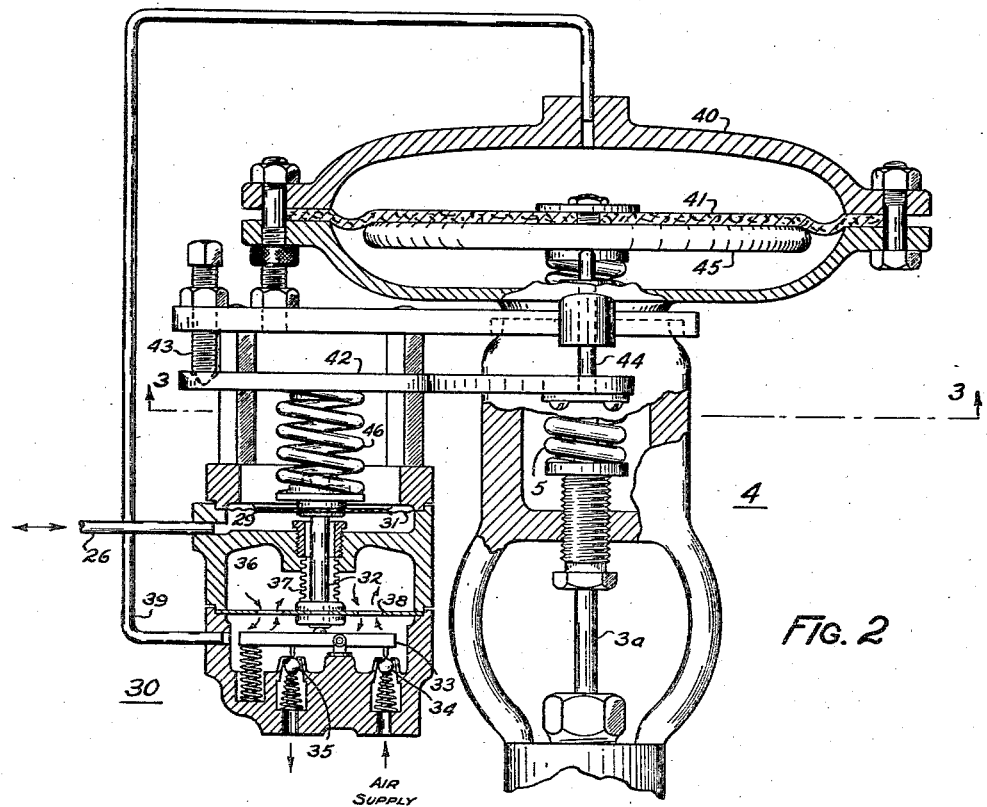
Fig. 2 is an enlarged elevation view partially in section of a part of Fig. 1.

Referring to Fig. 2, I have therein shown the servo-motor 4 partially in section and to larger scale. The pipe 26 connects to a chamber 29 of a relay 30. One wall of the chamber 29 is formed by a diaphragm 31 to which is connected a movable member 32 operating a horizontal pivoted valve member 33 when displaced from a neutral position. The valve member 33, when positioned in a clockwise direction serves to open a supply valve 34, and when positioned in a counter-clockwise direction serves to open an exhaust valve 35.

Operation of the valve member 33 accordingly serves to increase or decrease the pressure within a chamber 36 separated from the chamber 29 by a suitable expansible contractible sealing gland 37. The lower end of the movable member 32 is held in proper position by means of a flexible web 38.

Pressures within the chamber 36 are transmitted through a pipe 39 to the interior of a casing 40, which is partitioned by a pressure sensitive diaphragm 41. Upon an increase in pressure within the chamber 36 it is apparent that the force against the diaphragm 41 will increase, serving to position the valve 3 in an opening direction. Conversely, upon a decrease in pressure within the chamber 36 the pressure effective upon the diaphragm 41 will decrease and the valve 3 will be positioned in a closing direction. It is therefor apparent that upon an increase in pressure within the chamber 29 the diaphragm 31 will be positioned upwardly, opening the supply valve 34 and admitting fluid at a relatively high pressure to the chamber 36, which in manner aforesaid will be transmitted through the pipe 39 to the interior of the casing 40. Conversely upon the slightest decrease of pressure within the chamber 29 necessary to maintain the diaphragm 31 in the neutral position the exhaust valve 35 will be opened, rapidly exhausting pressure fluid from the casing 40.

In order that the diaphragm 31 and movable member 32 will be restored to the neutral position when the position of the valve 3 is in proportion to the magnitude of the loading pressure effective within the chamber 29, I impose upon the diaphragm 31, in opposition to the loading pressure within the chamber 29, a force proportional to the position of the valve member 3. In Fig. 2 I accomplish this by providing a substantially horizontal member 42 oscillatable about an adjustable bearing screw 43. The opposite end of the member 42 is pivotally connected by means of push rods 44 to a plate 45 which is positioned by and upon which the diaphragm 41 rests. The member 42 is urged against the bearing screw 43 and push rods 44 by a compression spring 46 resting upon the diaphragm 31. As the diaphragm 41 moves downwardly in response to an increase in fluid pressure, the force transmitted through the spring 46 to the diaphragm 31 varies proportionately. Upon an increase in loading pressure within the chamber 29, for example, effecting such downward movement of the diaphragm 41, the force exerted upon the diaphragm 31 by the spring 46 will increase until it is equal to that produced by the loading pressure within the chamber 29, when the diaphragm 31 will be restored to the neutral position.

As the pressure effective for positioning the diaphragm 41 is that of the supply pressure admitted through the valve 34, it is apparent that if for any reason the valve 3 should fail to respond instantaneously to changes in loading pressure within the chamber 29, the pressure effective upon the diaphragm 41 will continue to increase until such movement does occur. Thus a change in loading pressure within the chamber 29 of but one or two inches of water may, if necessary, in order to produce the desired movement, effect a change in pressure on the diaphragm 41 of several pounds.

Figure 3:
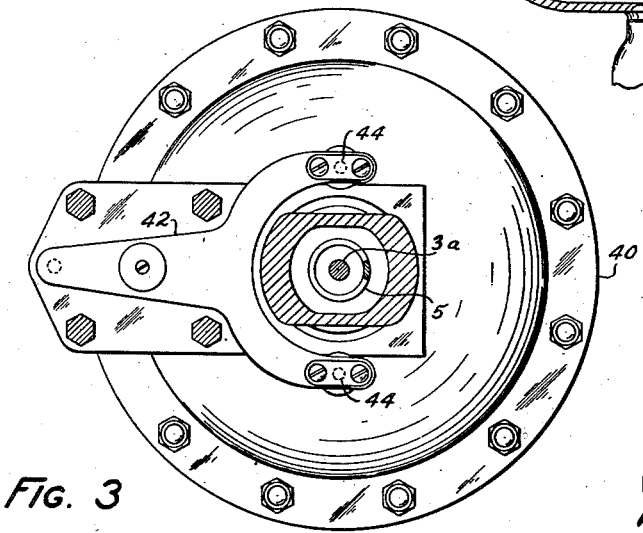
Fig. 3 is a plan view taken along the lines 3—3 of Fig. 2.

In Fig. 3 the member 42 is shown in plan view. In order that the reaction of the member against the diaphragm 41 may be uniform, and to prevent binding of the spring 46, it is preferably bifurcated as shown and is held in proper position by the pins 44 located on either side of the movable valve member 3a of the valve 3.

Figure 4:
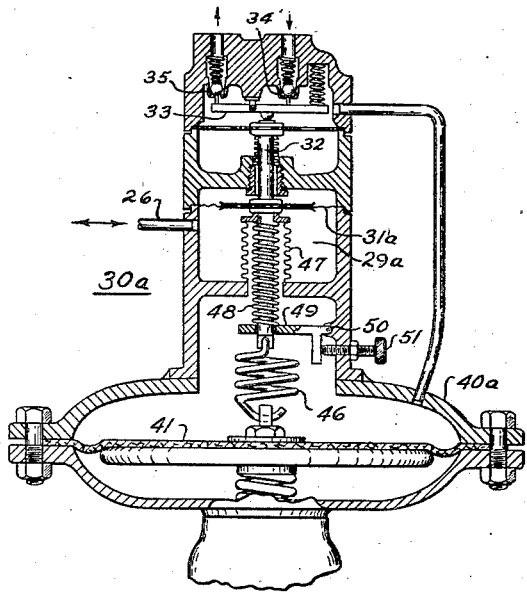
Figs. 4 and 5 illustrate alternate arrangements which may be used in place of that shown in Fig. 2.

In Fig. 4 I show a modified form of construction of the servo-motor. Therein a modified diaphragm casing 40a is used; properly arranged to support a relay 30a operating in similar fashion to the relay 30. Pressures from the pipe 26 are admitted to a chamber 29a where they are effective against a diaphragm 31a. Movements of the diaphragm 31a from a neutral position are effective for positioning the horizontal valve member 33 in one direction or the other to open the supply valve 34 or the exhaust valve 35, depending upon whether the movement of the diaphragm 31a is in one direction or the other. So that the diaphragm 31a will be positioned to the neutral position when the movement of the valve 3 is in proportion to the change in loading pressure, I show secured to the diaphragms 41 and 31a a spring 46 which exerts a force upon the diaphragm 31a varying with the position of the diaphragm 41. The chamber 29a may be pressure sealed from the chamber above the diaphragm 41 by a suitable expansible contractible bellows 47.

If desired, an arrangement may be provided so that the valve 3 may be moved to any desired initial position for a given loading pressure effective within the chamber 29a. In Fig. 4 I accomplish this by providing an auxiliary spring 48 urged against the diaphragm 31a and supported by a suitable bell crank 49 adapted to be positioned about a pivot 50 by an adjusting screw 51 extending externally of the relay 30a.

Movement of the bell crank 49 in a direction to compress the spring 48 will act, for a given loading pressure within the chamber 29a, to increase the counterbalancing force of the spring 46 necessary to maintain the diaphragm 31a in the neutral position. Accordingly, increasing the compression of the spring 48, acts to move the valve 3 in an opening direction.

Figure 5:
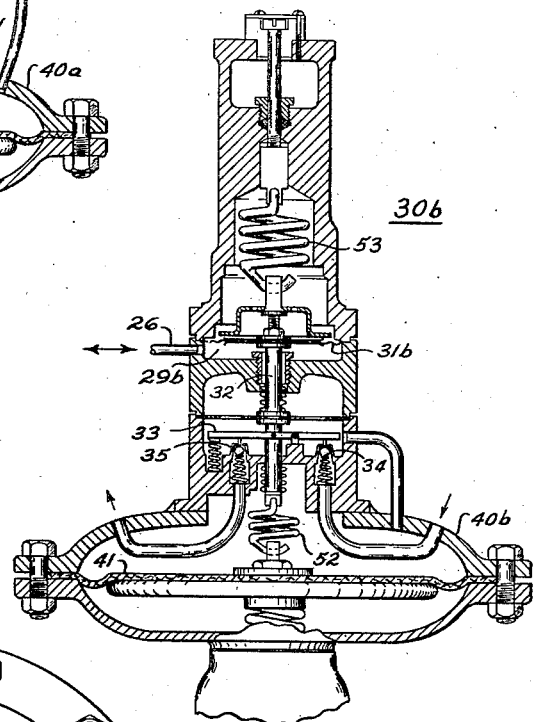

In Fig. 5 I show a further modified form of servo-motor wherein the loading pressure is introduced into a chamber 29b and is effective for producing a force upon a diaphragm 31b. Movements of the diaphragm 31b are transmitted through a movable member 32 to the movable valve member 33 and are effective for controlling the operation of the supply valve 34 and exhaust valve 35. So that the diaphragm 31b will be restored to the neutral position upon movement therefrom in response to a change in loading pressure within the chamber 29b; the diaphragm 41 is shown connected to the movable member 32 by a spring 52, which imposes upon the diaphragm 31b a force proportional to the position of the diaphragm 41 and acting in opposition to that imposed by the pressure within the chamber 29b.

The initial position of the diaphragm 41 and accordingly of the valve 3 may be varied as desired for a given loading pressure within the chamber 29b by means of an adjustable spring 53 acting to impose a force upon the diaphragm 31b. As the force on the diaphragm 31b in an upward direction produced by the spring 53 is increased, the valve 3 will be correspondingly positioned in an opening direction.

While in accordance with the patent statutes I have illustrated certain specific embodiments of my invention, it is apparent that it is susceptible to a variety of modifications, that it is not limited solely to the control of temperature by means of a flow regulating valve; but that it may be used with any type of regulator for any agent producing, affecting or maintaining a controlled condition.

What I claim as new and desire to secure by Letters Patent of the United States, is:

In combination, a valve having a body and a movable valve member, a housing supported by said body, a pressure sensitive diaphragm positioned in said housing, a valve stem for transmitting movements of said diaphragm to said valve member, a spring for opposing movements of said diaphragm, a casing supported by said housing and having a pressure sensitive movable wall, a lever having one end positioned by said diaphragm and the other adapted to pivot about a support on said casing, a spring for supporting said lever located intermediate the ends of said lever and resting on said movable wall, a source of pressure fluid, a chamber in said casing connected to transmit pressure fluid to said diaphragm housing, and valve means in said chamber actuated by said movable wall for admitting pressure fluid from said source to said housing, or exhausting pressure fluid therefrom.

HARVARD H. GORRIE.